(12) United States Patent
Gu et al.

(10) Patent No.: US 11,354,303 B2
(45) Date of Patent: Jun. 7, 2022

(54) DISTRIBUTED TRANSACTION PROCESSING METHOD AND SYSTEM BASED ON MESSAGE QUEUE AND DATABASE

(71) Applicant: Shanghai IceKredit, Inc., Shanghai (CN)

(72) Inventors: Lingyun Gu, Shanghai (CN); Zhipan Guo, Shanghai (CN); Wei Wang, Shanghai (CN); Chang Liu, Shanghai (CN)

(73) Assignee: Shanghai IceKredit, Inc., Shanghai (CN)

( * ) Notice: Subject to any disclaimer, the term of this patent is extended or adjusted under 35 U.S.C. 154(b) by 0 days.

(21) Appl. No.: 17/376,161

(22) Filed: Jul. 15, 2021

(65) Prior Publication Data

US 2022/0058181 A1 Feb. 24, 2022

(30) Foreign Application Priority Data

Aug. 20, 2020 (CN) .......................... 202010840396.6

(51) Int. Cl.
*G06F 16/23* (2019.01)
(52) U.S. Cl.
CPC ................................ *G06F 16/2379* (2019.01)
(58) Field of Classification Search
CPC .................................................. G06F 16/2379
See application file for complete search history.

(56) References Cited

U.S. PATENT DOCUMENTS 6,058,389 A * 5/2000 Chandra ............... G06F 16/252
7,702,739 B1 * 4/2010 Cheng .................. H04L 67/327
709/207

(Continued)

FOREIGN PATENT DOCUMENTS

| CN | 109815248 A | 5/2019 |
| CN | 111258723 A | 6/2020 |
| WO | 2018119116 A1 | 6/2018 |

OTHER PUBLICATIONS

Fang Yi, et al., Distributed Transaction Processing Under Microservice Architecture, Computer Applications and Software, 2019, pp. 152-158, vol. 36 No. 1.

*Primary Examiner* — Robert W Beausoliel, Jr.
*Assistant Examiner* — Mohammad Solaiman Bhuyan
(74) *Attorney, Agent, or Firm* — Bayramoglu Law Offices LLC

(57) ABSTRACT

A distributed transaction processing method and system based on a message queue and a database is provided. In the method, a component encapsulation server generates a target compressed package according to the obtained first configuration information of a business request server and the obtained second configuration information of a business execution server, and sends the target compressed package to the business request server and the business execution server, respectively, so that the business request server and the business execution server can decompress and configure the target compressed package to deploy a transaction processing component and a message transmission path. The system includes the component encapsulation server, the business request server and the business execution server. The business request server and the business execution server communicate with each other through the message queue. The component encapsulation server communicates (Continued)

with the business request server and the business execution server, respectively.

14 Claims, 2 Drawing Sheets

(56) References Cited

U.S. PATENT DOCUMENTS

| | | | | |
|---|---|---|---|---|
| 2003/0220944 | A1* | 11/2003 | Lyman Schottland | ..................... G06F 8/658 |
| 2005/0262182 | A1* | 11/2005 | Thole | ....................... G06F 9/466 709/200 |
| 2011/0276636 | A1* | 11/2011 | Cheng | ..................... H04L 69/14 709/206 |
| 2014/0149803 | A1 | 5/2014 | Lehofer et al. | |

* cited by examiner

DISTRIBUTED TRANSACTION PROCESSING METHOD AND SYSTEM BASED ON MESSAGE QUEUE AND DATABASE

CROSS REFERENCE TO THE RELATED APPLICATIONS

This application is based upon and claims priority to Chinese Patent Application No. 202010840396.6, filed on Aug. 20, 2020, the entire contents of which are incorporated herein by reference.

TECHNICAL FIELD

The present invention relates to the technical field of transaction processing, and more particularly, to a distributed transaction processing method and system based on a message queue and a database.

BACKGROUND

As the smallest working unit of a database operation, a transaction is a series of operations executed by a single logical unit of work (LUW). A distributed transaction means that a transaction participant, a transaction supporting server, a resource server, and a transaction manager are located on different nodes in different distributed systems, respectively. However, Java database connectivity (JDBC) can only ensure that transactions in an identical database are valid in codes of an identical system, and cannot guarantee the consistency of transactions between different databases or different systems.

Although related technologies such as an XA two-phase commit scheme, a try-confirm-cancel (TCC) scheme, a best-effort-notify (BEN) scheme, and a reliable-message eventual consistency scheme can solve the above-mentioned transaction consistency problem, there are some issues in these technologies. Specifically, the XA two-phase commit scheme has poor performance. Implementation of code logic of the TCC scheme is complicated. The BEN scheme is applied to a single scenario, and can only be applied to a business with low sensitivity to time of eventual consistency. The reliable-message eventual consistency scheme needs to use a specific message queue RocketMq, which limits selection of a message queue.

Therefore, a message queue—based eventual consistency scheme is widely used to solve the transaction consistency problem. The message queue—based eventual consistency scheme, however, has poor usability, and is difficult to be quickly deployed in different distributed systems.

SUMMARY

In order to solve the above problems, the present invention provides a distributed transaction processing method and system based on a message queue and a database, which can generate a target compressed package for deploying a distributed transaction processing component according to configuration information of different business request servers and business execution servers. In this way, the business request server and the business execution server can separately deploy the distributed transaction processing component and a related function based on the target compressed package, thereby improving usability and deployment efficiency of a distributed transaction processing scheme based on a message queue and a database.

A first aspect of the embodiments of the present invention provides a distributed transaction processing method based on a message queue and a database, applied to a distributed transaction processing system. The distributed transaction processing system includes a component encapsulation server, a business request server, and a business execution server. The business request server and the business execution server communicate with each other through the message queue. The component encapsulation server communicates with the business request server and the business execution server, respectively. The method includes:

obtaining first configuration information of the business request server and second configuration information of the business execution server by the component encapsulation server, where the first configuration information includes data source information of the business request server and first parameter information of a transaction manager in the business request server, and the second configuration information includes second parameter information of a transaction processor in the business execution server;

generating a target compressed package by the component encapsulation server according to the first configuration information and the second configuration information, and sending the target compressed package to the business request server and the business execution server, respectively;

decompressing and configuring the target compressed package by the business request server, generating a transaction processing component, and importing prestored user information to the transaction processing component;

decompressing and configuring the target compressed package by the business execution server, and establishing a message transmission path between the transaction processor and the message queue;

creating a user record in the transaction processing component by the business request server according to a received user request, generating a transaction message according to the user record, and sending the transaction message to the message queue, where the transaction processing component includes the database for storing the user record; and extracting the transaction message by the business execution server from the message queue through the message transmission path, and processing the transaction message through the transaction manager.

Optionally, the step of generating the target compressed package by the component encapsulation server according to the first configuration information and the second configuration information includes:

determining a matching path between the data source information and the first parameter information, where the matching path includes a call path of target information in the data source information called by the transaction manager in a process of creating a transaction publishing table;

extracting node attribute information and a node association identifier of each path node in the matching path, where the node attribute information is used to represent an address of storage space of a path node, and the association identifier is used to represent a hierarchical relationship between path nodes;

generating a script file of a distributed transaction processing component according to the node attribute information and the node association identifier, and adding a first device label of the business request server to the script file to obtain a target script file;

constructing an information list of the second parameter information of the transaction processor, and determining a plurality of pieces of business thread information corresponding to the information list; concatenating character strings corresponding to each piece of business thread information based on an interface parameter of a data interface to obtain a path parameter of the data interface; and packaging the path parameter to obtain a path installation package of the transaction processor, and adding a second device label of the business execution server to the path installation package; and compressing the target script file and the path installation package to obtain the target compressed package.

Optionally, the step of decompressing and configuring the target compressed package by the business request server, and generating the transaction processing component includes:

obtaining the script file from the target compressed package, and running the script file to generate the transaction processing component for storing the data source information and the first parameter information.

Optionally, the step of decompressing and configuring the target compressed package by the business execution server, and establishing the message transmission path between the transaction processor and the message queue includes:

decompressing the path installation package to obtain the path parameter;

configuring a handler-type full path of each piece of theme information corresponding to the message queue according to the path parameter; and establishing the message transmission path between the transaction processor and the message queue according to the handler-type full path and a path matching rate of each piece of business thread information, where the message transmission path supports transmission of different types of transaction messages.

Optionally, the step of creating the user record in the transaction processing component by the business request server according to the received user request, and generating the transaction message according to the user record includes:

creating a user record with a first state in a transaction publishing table of the transaction processing component; and obtaining payload information for recording transaction content of the user request from the database of the transaction processing component, and determining the payload information as the transaction message.

Optionally, after the step of sending the transaction message to the message queue, the method further includes:

modifying the user record from the first state to a second state, where the first state is used to represent that the user record is newly created or is not published, and the second state is used to represent that the user record has been published.

Optionally, the step of processing the transaction message through the transaction manager includes:

processing the transaction message based on a transaction processing table in the transaction manager, and labeling a processing record corresponding to the transaction message in the transaction processing table.

A second aspect of the embodiments of the present invention provides a distributed transaction processing system based on a message queue and a database, including a component encapsulation server, a business request server, and a business execution server. The business request server and the business execution server communicate with each other through the message queue. The component encapsulation server communicates with the business request server and the business execution server, respectively.

The component encapsulation server is configured to obtain first configuration information of the business request server and second configuration information of the business execution server, where the first configuration information includes data source information of the business request server and first parameter information of a transaction manager in the business request server, and the second configuration information includes second parameter information of a transaction processor in the business execution server.

The component encapsulation server is configured to generate a target compressed package according to the first configuration information and the second configuration information, and send the target compressed package to the business request server and the business execution server, respectively.

The business request server is configured to decompress and configure the target compressed package, generate a transaction processing component, and import prestored user information to the transaction processing component.

The business execution server is configured to decompress and configure the target compressed package, and establish a message transmission path between the transaction processor and the message queue.

The business request server is configured to create a user record in the transaction processing component according to a received user request, generate a transaction message according to the user record, and send the transaction message to the message queue, where the transaction processing component includes the database for storing the user record.

The business execution server is configured to extract the transaction message from the message queue through the message transmission path, and process the transaction message through the transaction manager.

Optionally, the component encapsulation server, through following steps, generates the target compressed package according to the first configuration information and the second configuration information:

determining a matching path between the data source information and the first parameter information, where the matching path includes a call path of target information in the data source information called by the transaction manager in a process of creating a transaction publishing table;

extracting node attribute information and a node association identifier of each path node in the matching path, where the node attribute information is used to represent an address of storage space of a path node, and the association identifier is used to represent a hierarchical relationship between path nodes;

generating a script file of a distributed transaction processing component according to the node attribute information and the node association identifier, and adding a first device label of the business request server to the script file to obtain a target script file;

constructing an information list of the second parameter information of the transaction processor, and determining a plurality of pieces of business thread information corresponding to the information list; concatenating character strings corresponding to each piece of business thread information based on an interface parameter of a data interface to obtain a path parameter of the data interface; and packaging the path parameter to obtain a path installation package of the transaction processor, and adding a second device label of the business execution server to the path installation package; and compressing the target script file and the path installation package to obtain the target compressed package.

Optionally, the business request server, through following steps, decompresses and configures the target compressed package, and generates the transaction processing component:

obtaining the script file from the target compressed package, and running the script file to generate the transaction processing component for storing the data source information and the first parameter information; and the business execution server, through following steps, decompresses and configures the target compressed package, and establishes the message transmission path between the transaction processor and the message queue:

decompressing the path installation package to obtain the path parameter; configuring a handler-type full path of each piece of theme information corresponding to the message queue according to the path parameter; and establishing the message transmission path between the transaction processor and the message queue according to the handler-type full path and a path matching rate of each piece of business thread information, where the message transmission path supports transmission of different types of transaction messages.

According to the distributed transaction processing method and system based on a message queue and a database in the embodiments of the present invention, the component encapsulation server generates the target compressed package according to the obtained first configuration information of the business request server and the obtained second configuration information of the business execution server, and sends the target compressed package to the business request server and the business execution server, respectively, so that the business request server and the business execution server can decompress and configure the target compressed package to deploy the transaction processing component and the message transmission path. In this way, different business request servers and business execution servers can perform distributed transaction processing based on a message queue, thereby improving usability and deployment efficiency of a distributed transaction processing scheme based on a message queue and a database.

BRIEF DESCRIPTION OF THE DRAWINGS

To describe the technical solutions in the embodiments of the present invention more clearly, the drawings required for describing the embodiments are briefly described below. It should be understood that, the following drawings show merely some embodiments of the present invention, and therefore should not be regarded as a limitation on the scope. Those skilled in the art may still derive other related drawings from these drawings without creative efforts.

In the figures.

100: distributed transaction processing system;
200: component encapsulation server;
300: business request server; 310: transaction manager;
400: business execution server; 410: transaction processor; and
500: message queue.

DETAILED DESCRIPTION OF THE EMBODIMENTS

In order to facilitate better understanding of the above technical solutions, the technical solutions in the present invention are described in detail with reference to the drawings and specific embodiments. It should be understood that the embodiments in the present invention and the specific features in the embodiments are detailed descriptions of the technical solutions in the present invention, and are not intended to limit the technical solutions in the present invention. The embodiments in the present invention as well as technical features in the embodiments may be combined with each other as long as there is no conflict.

Figure 1:
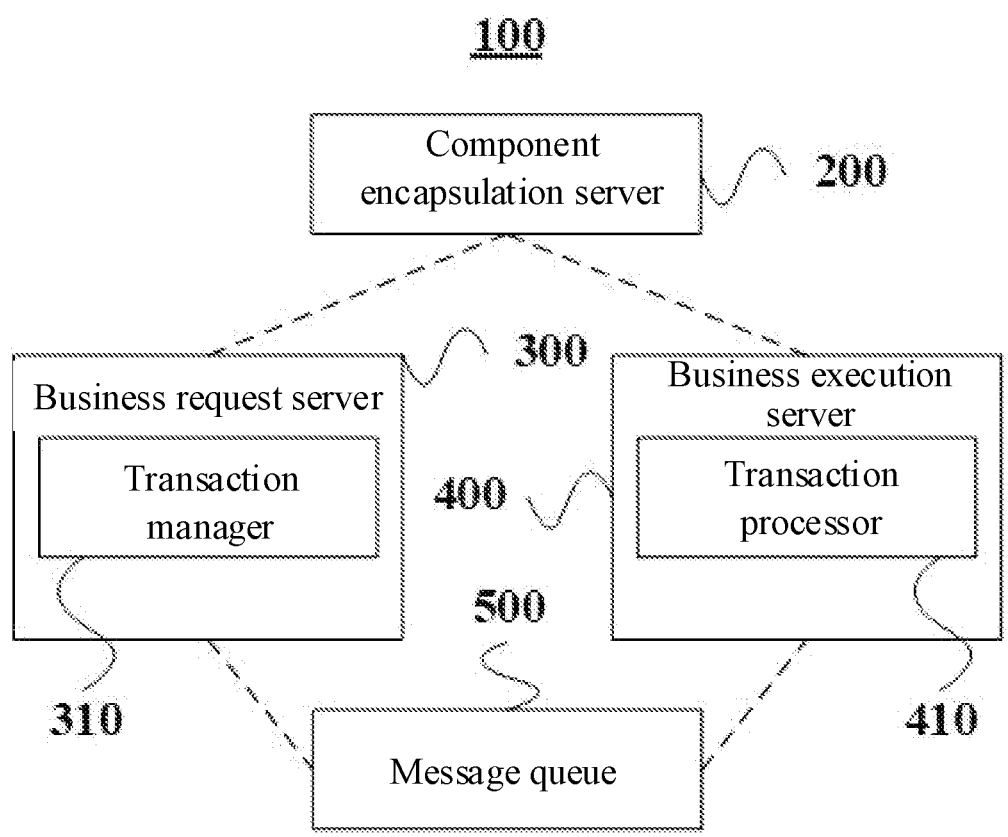
FIG. 1 is a schematic diagram of a communication framework of a distributed transaction processing system based on a message queue and a database according to an embodiment of the present invention.

FIG. 1 is a schematic diagram of a communication framework of the distributed transaction processing system 100 based on a message queue and a database. The distributed transaction processing system 100 may include the component encapsulation server 200, the business request server 300, and the business execution server 400. The business request server 300 and the business execution server 400 communicate with each other through the message queue 500. The component encapsulation server 200 communicates with the business request server 300 and the business execution server 400, respectively. In an embodiment, the message queue 500 is a container for storing a message in a message transmission process.

Figure 2:
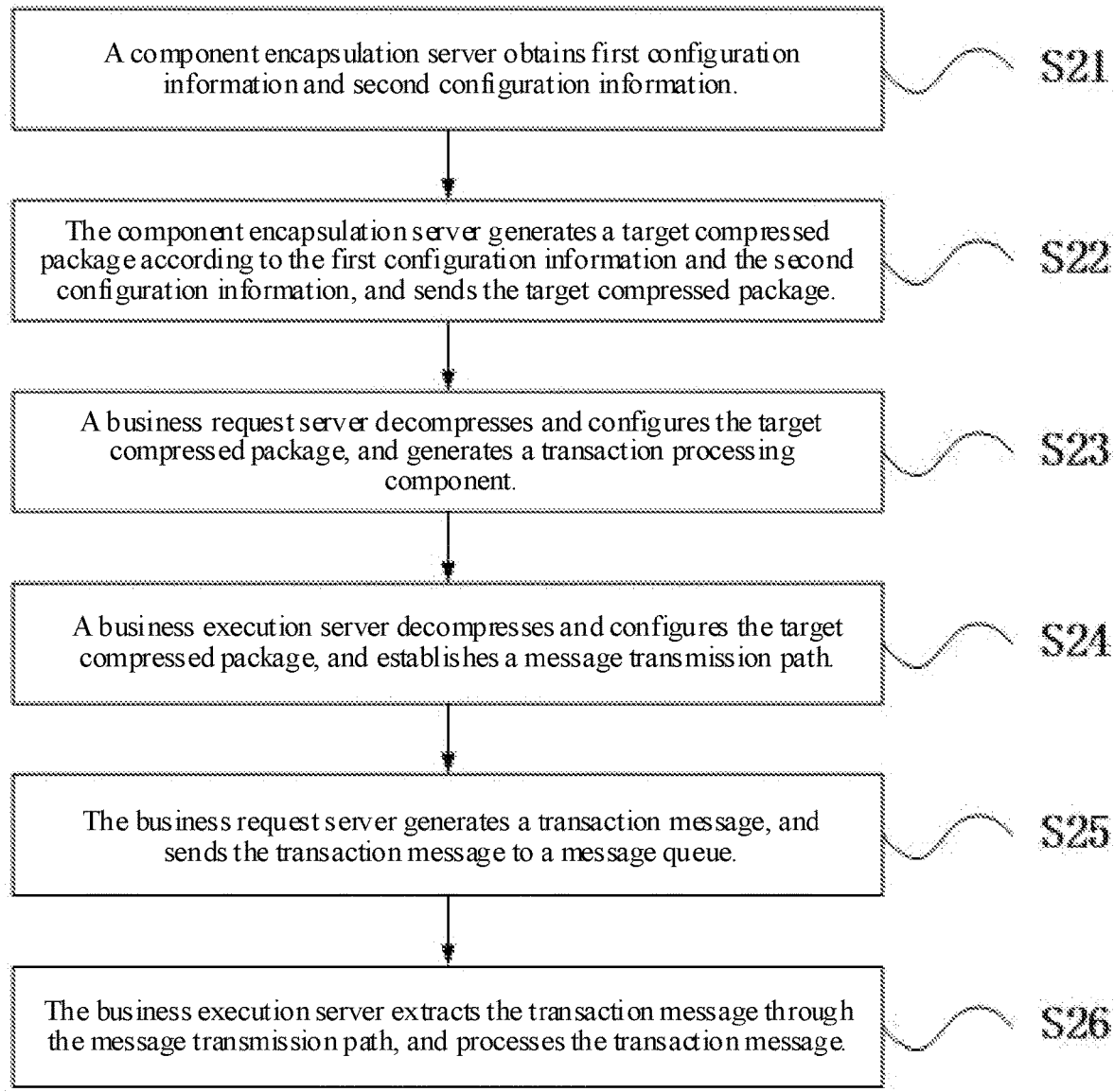
FIG. 2 is a flowchart of a distributed transaction processing method based on a message queue and a database according to an embodiment of the present invention.

Based on the above descriptions, FIG. 2 is a flowchart of a distributed transaction processing method based on a message queue and a database. The distributed transaction processing method may be applied to the distributed transaction processing system 100 based on the message queue and the database in FIG. 1, and may specifically include the following steps S210 to S260.

Step S210: the component encapsulation server obtains first configuration information of the business request server and second configuration information of the business execution server.

In an embodiment, the first configuration information includes data source information of the business request server and first parameter information of a transaction manager in the business request server, and the second configuration information includes second parameter information of a transaction processor in the business execution server.

Step S220: the component encapsulation server generates a target compressed package according to the first configuration information and the second configuration information, and sends the target compressed package to the business request server and the business execution server, respectively.

Step S230: the business request server decompresses and configures the target compressed package, generates a transaction processing component, and imports prestored user information to the transaction processing component.

Step S240: the business execution server decompresses and configures the target compressed package, and establishes a message transmission path between the transaction processor and the message queue.

Step S250: the business request server creates a user record in the transaction processing component according to a received user request, generates a transaction message according to the user record, and sends the transaction message to the message queue.

In an embodiment, the transaction processing component includes a database for storing the user record.

Step S260: the business execution server extracts the transaction message from the message queue through the message transmission path, and processes the transaction message through the transaction manager.

The following advantages can be achieved by performing the above steps S210 to S260. The component encapsulation server generates the target compressed package according to the obtained first configuration information of the business request server and the obtained second configuration information of the business execution server, and sends the target compressed package to the business request server and the business execution server, respectively, so that the business request server and the business execution server can decompress and configure the target compressed package to deploy the transaction processing component and the message transmission path. In this way, different business request servers and business execution servers can perform distributed transaction processing based on a message queue, thereby improving usability and deployment efficiency of a distributed transaction processing scheme based on a message queue and a database.

In specific implementation, the inventor finds that in a process of generating the target compressed package, heterogeneity of the business request server 300 and the business execution server 400 needs to be considered. Further, the transaction manager 310 in the business request server 300 and the transaction processor 410 in the business execution server 400 have different processing logic when the transaction processing is performed. In order to accurately deploy the transaction processing component and the message transmission path, the step of generating the target compressed package according to the first configuration information and the second configuration information in step S220 may specifically include the following steps S221 to S225.

Step S221: a matching path between the data source information and the first parameter information is determined, where the matching path includes a call path of target information in the data source information called by the transaction manager in a process of creating a transaction publishing table.

Step S222: node attribute information and a node association identifier of each path node in the matching path are extracted.

In an embodiment, the node attribute information is used to represent an address of storage space of a path node, and the association identifier is used to represent a hierarchical relationship between path nodes.

Step S223: a script file of a distributed transaction processing component is generated according to the node attribute information and the node association identifier, and a first device label of the business request server is added to the script file to obtain a target script file.

Step S224: an information list of the second parameter information of the transaction processor is constructed, and a plurality of pieces of business thread information corresponding to the information list are determined; character strings corresponding to each piece of business thread information are concatenated based on an interface parameter of a data interface to obtain a path parameter of the data interface; and the path parameter is packaged to obtain a path installation package of the transaction processor, and a second device label of the business execution server is added to the path installation package.

Step S225: the target script file and the path installation package are compressed to obtain the target compressed package.

It can be understood that, through the above steps S221 to S225, the difference between the processing logic of the transaction manager 310 and the processing logic of the transaction processor 410 can be considered to generate the corresponding target script file and path installation package, and thus it can be ensured that the transaction processing component and the message transmission path are accurately deployed.

Based on the above steps S221 to S225, the step of decompressing and configuring the target compressed package by the business request server, and generating the transaction processing component in step S230 may specifically include: obtaining the script file from the target compressed package, and running the script file to generate the transaction processing component for storing the data source information and the first parameter information. In this way, the transaction processing component can be quickly deployed in different business request servers 300, without simulating the transaction processing component by the business request server 300, thereby simplifying a deployment process.

Based on the above steps S221 to S225, the step of decompressing and configuring the target compressed package by the business execution server, and establishing the message transmission path between the transaction processor and the message queue in step S240 may specifically include the following steps (1) to (3):

(1) decompressing the path installation package to obtain the path parameter;

(2) configuring a handler-type full path of each piece of theme information corresponding to the message queue according to the path parameter; and (3) establishing the message transmission path between the transaction processor and the message queue according to the handler-type full path and a path matching rate of each piece of business thread information.

In an embodiment, the message transmission path supports transmission of different types of transaction messages.

It can be understood that, through the above steps (1) to (3), the business execution server 400 can accurately establish the message transmission path between the transaction manager 410 and the message queue, thereby ensuring a transmission rate and reliability of the transaction message.

Further, in an embodiment, the step of creating the user record in the transaction processing component by the business request server according to the received user request, and generating the transaction message according to the user record in step S250 may specifically include the following steps S251 and S252.

Further, when the business request server 300 sends the transaction message to the message queue 500, it is required to determine an interface between the business request server 300 and the message queue 500. The transaction processing component can abstract the interface, so as to send the transaction message based on the specific message queue 500.

Step S251: a user record with a first state is created in a transaction publishing table of the transaction processing component.

Step S252: payload information for recording transaction content of the user request is obtained from the database of the transaction processing component, and the payload information is determined as the transaction message.

For example, after receiving the user request, the business request server 300 starts a transaction, and creates a user record with a status being NEW in the transaction publishing table of the transaction processing component, where the status can be understood as a status of the user record, and NEW represents the first state, indicating that the user record is newly created or is not published.

Further, a timer in the business request server 300 first starts the transaction, obtains the payload information for recording the transaction content of the user request from the database of the transaction processing component, and then sends the payload information to the message queue 500. After the payload information is successfully sent, the user record is modified from the first state to a second state. In an embodiment, the second state is used to represent that the user record has been published. For example, the user record with the status being NEW in the database may be modified to the user record with the status being PUBLISHED, and then the transaction is committed.

Further, the business execution server 400 processes the transaction message based on the transaction processing table in the transaction manager 410, and labels a processing record corresponding to the transaction message in the transaction processing table. For example, the processing record may be modified to a PROCESSSED state, and then the transaction is committed. It can be understood that the processing record is labeled to prevent the processing record from being processed repeatedly. This can reduce the running load of the business execution server 400.

To sum up, according to the distributed transaction processing method and system based on a message queue and a database in the embodiments of the present invention, the component encapsulation server generates the target compressed package according to the obtained first configuration information of the business request server and the obtained second configuration information of the business execution server, and sends the target compressed package to the business request server and the business execution server, respectively, so that the business request server and the business execution server can decompress and configure the target compressed package to deploy the transaction processing component and the message transmission path. In this way, different business request servers and business execution servers can perform distributed transaction processing based on a message queue, thereby improving usability and deployment efficiency of a distributed transaction processing scheme based on a message queue and a database.

The above merely describes embodiments of the present invention, which are not intended to limit the present invention. Various changes and modifications can be made to the present invention by those skilled in the art. Any modifications, equivalent replacements, improvements and other made within the spirit and principle of the present invention shall fall within the scope of the claims of the present invention.

What is claimed is:

1. A distributed transaction processing method based on a message queue and a database, applied to a distributed transaction processing system; wherein the distributed transaction processing system comprises a component encapsulation server, a business request server, and a business execution server; the business request server and the business execution server communicate with each other through the message queue; the component encapsulation server communicates with the business request server and the business execution server, respectively; the distributed transaction processing method comprises:

obtaining first configuration information of the business request server and second configuration information of the business execution server by the component encapsulation server, wherein the first configuration information comprises data source information of the business request server and first parameter information of a transaction manager in the business request server, and the second configuration information comprises second parameter information of a transaction processor in the business execution server;

generating a target compressed package by the component encapsulation server according to the first configuration information and the second configuration information, and sending the target compressed package to the business request server and the business execution server, respectively;

decompressing and configuring the target compressed package by the business request server, generating a transaction processing component, and importing pre-stored user information to the transaction processing component;

decompressing and configuring the target compressed package by the business execution server, and establishing a message transmission path between the transaction processor and the message queue;

creating a user record in the transaction processing component by the business request server according to a received user request, generating a transaction message according to the user record, and sending the transaction message to the message queue, wherein the transaction processing component comprises the database for storing the user record; and extracting the transaction message by the business execution server from the message queue through the message transmission path, and processing the transaction message through the transaction manager.

2. The distributed transaction processing method according to claim 1, wherein the step of generating the target compressed package by the component encapsulation server according to the first configuration information and the second configuration information comprises:

determining a matching path between the data source information and the first parameter information, wherein the matching path comprises a call path of target information in the data source information called by the transaction manager in a process of creating a transaction publishing table;

extracting node attribute information and a node association identifier of each path node in the matching path, wherein the node attribute information is used to represent an address of storage space of a path node, and the association identifier is used to represent a hierarchical relationship between path nodes;

generating a script file of a distributed transaction processing component according to the node attribute information and the node association identifier, and adding a first device label of the business request server to the script file to obtain a target script file;

constructing an information list of the second parameter information of the transaction processor, and determining a plurality of pieces of business thread information corresponding to the information list; concatenating character strings corresponding to each piece of business thread information based on an interface parameter of a data interface to obtain a path parameter of the data interface; and packaging the path parameter to obtain a path installation package of the transaction processor, and adding a second device label of the business execution server to the path installation package; and compressing the target script file and the path installation package to obtain the target compressed package.

3. The distributed transaction processing method according to claim 2, wherein the step of decompressing and configuring the target compressed package by the business request server, and generating the transaction processing component comprises:

obtaining the script file from the target compressed package, and running the script file to generate the transaction processing component for storing the data source information and the first parameter information.

4. The distributed transaction processing method according to claim 2, wherein the step of decompressing and configuring the target compressed package by the business execution server, and establishing the message transmission path between the transaction processor and the message queue comprises:

decompressing the path installation package to obtain the path parameter;

configuring a handler-type full path of each piece of theme information corresponding to the message queue according to the path parameter; and establishing the message transmission path between the transaction processor and the message queue according to the handler-type full path and a path matching rate of each piece of business thread information, wherein the message transmission path supports transmission of different types of transaction messages.

5. The distributed transaction processing method according to claim 1, wherein the step of creating the user record in the transaction processing component by the business request server according to the received user request, and generating the transaction message according to the user record comprises:

creating a user record with a first state in a transaction publishing table of the transaction processing component; and obtaining payload information for recording transaction content of the user request from the database of the transaction processing component, and determining the payload information as the transaction message.

6. The distributed transaction processing method according to claim 5, wherein after the step of sending the transaction message to the message queue, the method further comprises:

modifying the user record from the first state to a second state, wherein the first state is used to represent that the user record is newly created or is not published, and the second state is used to represent that the user record has been published.

7. The distributed transaction processing method according to claim 1, wherein the step of processing the transaction message through the transaction manager comprises:

processing the transaction message based on a transaction processing table in the transaction manager, and labeling a processing record corresponding to the transaction message in the transaction processing table.

8. The distributed transaction processing method according to claim 1, further comprising:

wherein a difference between a processing logic of the transaction manager and a processing logic of the transaction processor generate a corresponding target script file and path installation package.

9. The distributed transaction processing method according to claim 1, further comprising:

wherein the transaction processing component is deployed in the business request server without simulating the transaction processing component by the business request server.

10. A distributed transaction processing system based on a message queue and a database, comprising a component encapsulation server, a business request server, and a business execution server; wherein the business request server and the business execution server communicate with each other through the message queue; the component encapsulation server communicates with the business request server and the business execution server, respectively;

the component encapsulation server is configured to obtain first configuration information of the business request server and second configuration information of the business execution server, wherein the first configuration information comprises data source information of the business request server and first parameter information of a transaction manager in the business request server, and the second configuration information comprises second parameter information of a transaction processor in the business execution server;

the component encapsulation server is configured to generate a target compressed package according to the first configuration information and the second configuration information, and send the target compressed package to the business request server and the business execution server, respectively;

the business request server is configured to decompress and configure the target compressed package, generate a transaction processing component, and import prestored user information to the transaction processing component;

the business execution server is configured to decompress and configure the target compressed package, and establish a message transmission path between the transaction processor and the message queue;

the business request server is configured to create a user record in the transaction processing component according to a received user request, generate a transaction message according to the user record, and send the transaction message to the message queue, wherein the transaction processing component comprises the database for storing the user record; and the business execution server is configured to extract the transaction message from the message queue through the message transmission path, and process the transaction message through the transaction manager.

11. The distributed transaction processing system according to claim 10, wherein the component encapsulation server, through following steps, generates the target compressed package according to the first configuration information and the second configuration information:

determining a matching path between the data source information and the first parameter information, wherein the matching path comprises a call path of target information in the data source information called by the transaction manager in a process of creating a transaction publishing table;

extracting node attribute information and a node association identifier of each path node in the matching path, wherein the node attribute information is used to represent an address of storage space of a path node, and the association identifier is used to represent a hierarchical relationship between path nodes;

generating a script file of a distributed transaction processing component according to the node attribute information and the node association identifier, and adding a first device label of the business request server to the script file to obtain a target script file;

constructing an information list of the second parameter information of the transaction processor, and determining a plurality of pieces of business thread information corresponding to the information list; concatenating character strings corresponding to each piece of business thread information based on an interface parameter of a data interface to obtain a path parameter of the data interface; and packaging the path parameter to obtain a path installation package of the transaction processor, and adding a second device label of the business execution server to the path installation package; and compressing the target script file and the path installation package to obtain the target compressed package.

12. The distributed transaction processing system according to claim 11, wherein the business request server, through following steps, decompresses and configures the target compressed package, and generates the transaction processing component:

obtaining the script file from the target compressed package, and running the script file to generate the transaction processing component for storing the data source information and the first parameter information; and the business execution server, through following steps, decompresses and configures the target compressed package, and establishes the message transmission path between the transaction processor and the message queue:

decompressing the path installation package to obtain the path parameter;

configuring a handler-type full path of each piece of theme information corresponding to the message queue according to the path parameter; and establishing the message transmission path between the transaction processor and the message queue according to the handler-type full path and a path matching rate of each piece of business thread information, wherein the message transmission path supports transmission of different types of transaction messages.

13. The distributed transaction processing system according to claim 10, further comprising:

wherein a difference between a processing logic of the transaction manager and a processing logic of the transaction processor generate a corresponding target script file and path installation package.

14. The distributed transaction processing system according to claim 10, further comprising:

wherein the transaction processing component is deployed in the business request server without simulating the transaction processing component by the business request server.

* * * * *